United States Patent

Schäfer et al.

[11] 4,035,740
[45] July 12, 1977

[54] DYESTUFF LASER

[75] Inventors: Fritz Peter Schäfer, Goettingen; Horst Harnisch, Cologne; Roderich Raue, Leverkusen, all of Germany

[73] Assignee: Bayer Aktiengesellschaft, Leverkusen, Germany

[21] Appl. No.: 557,081

[22] Filed: Mar. 10, 1975

[30] Foreign Application Priority Data

Mar. 13, 1974  Germany .......................... 2411969

[51] Int. Cl.² .................... H03F 1/22; C09K 11/00
[52] U.S. Cl. ..................... 331/94.5 L; 252/301.17
[58] Field of Search ............ 252/301.2 R, 301.17; 331/94.5, 94.5 L

[56] References Cited

U.S. PATENT DOCUMENTS 3,521,187  7/1970  Snavely et al. .................. 331/94.5

OTHER PUBLICATIONS

Dye Lasers by Schafer et al., pp. 161–164, pub. by Springer-Verlag, New York, 1973.

*Primary Examiner*—F.C. Edmundson
*Attorney, Agent, or Firm*—Plumley and Tyner

[57] ABSTRACT

Coherent monochromatic radiation (laser light) in the wave length range of 450 to 560 nm is obtained by exciting with a pump light source a dyestuff solution containing a dyestuff of the formula

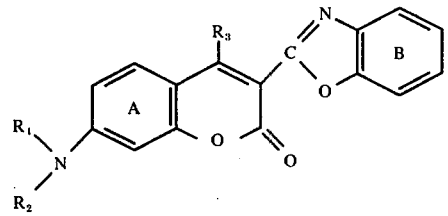

wherein $R_1$ represents hydrogen, alkyl, cycloalkyl, aralkyl, an alkylene radical linked to the 6-position of the coumarin ring system or, together with $R_2$ and the nitrogen atom to which they are bonded, and optionally with inclusion of further heteroatoms as ring members, represents the remaining members of a heterocyclic ring system, $R_2$ represents alkyl, aralkyl or an alkylene radical linked to the 8-position of the coumarin ring system and $R_3$ represents hydrogen or an optionally substituted phenyl radical, the rings A and B can carry further substituents and a carbocyclic 5-membered or 6-membered ring can be fused to the ring B, in a solvent which does not interfere with the emission, at a concentration, which emits laser beams, of, preferably, $10^{-2}$ to $10^{-4}$ mol/liter.

2 Claims, No Drawings

DYESTUFF LASER

The subject of the invention is a process for the production of coherent monochromatic radiation (laser light) by means of a dyestuff laser which consists of a reservoir for the dyestuff solution and an energy source, associated therewith, which is capable of exciting the dyestuff solution to produce an emission, the radiation produced being in the wavelength range of 450 to 560 nm.

A laser is a light intensification device by means of which it is possible to produce coherent monochromatic light of high intensity. Advantageous laser apparatuses have an optical resonance cavity which contains a liquid laser body located within a thin-walled quartz cylinder. This is usually part of a closed system through which the dyestuff solution is circulated by pumping whilst the laser is in operation. This avoids localised overheating, which leads to striation.

The excitation of the dyestuffs is effected by means of energy sources which emit electrons or rays, and the dyestuff laser can also be excited by a gas laser, for example a nitrogen laser or argon laser.

The excitation, also described as optical pumping, has the effect that the electrons of the molecule of the laser dyestuff are raised from their normal energy state to a high energy state, from which a radiation transition takes place. If the number of molecules present in the excited state exceeds the molecules present in the normal energy state, a spontaneous transition to the normal energy state, accompanied by emission, takes place and the light is reflected to and fro in the optical resonator and thereby intensified by stimulated emission. As a result of this stimulated resonance emission, yet further molecules are excited.

If one of the laser mirrors is partially transparent to light, a part of the radiation leaves the apparatus in the form of the laser beam. Dyestuffs which are particularly easily excited exhibit the phenomenon of "superradiance". If a quartz cell containing the solution of such a dyestuff is placed in the beam of a nitrogen laser, the solution emits laser light even without being located between resonator mirrors.

A considerable advantage of the dyestuff laser in comparison to solid or gaseous lasers is its ability to be tuned selectively. Because of the width of the fluorescence band of the dyestuffs employed, dyestuff lasers can be tuned, by inserting a scattering component, for example a diffraction grating or a prism, so that they emit laser light within the entire fluorescence band of the dyestuff.

Though a large number of suitable dyestuffs has already been proposed, there is still a lack of very effective compounds in the wavelength range around 500 nm.

Accordingly, the subject of the invention is a dyestuff laser consisting of a reservoir containing a laser dyestuff solution and a pump light source connected thereto, which is capable of exciting the dyestuff solution to produce an emission characterised in that the dyestuff solution contains a dyestuff of the general formula

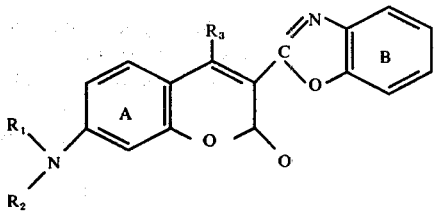

wherein
$R_1$ represents hydrogen, alkyl, cycloalkyl, aralkyl, an alkylene radical linked to the 6-position of the coumarin ring system or, together with $R_2$ and the nitrogen atom to which they are bonded, and optionally with inclusion of further hetero-atoms as ring members, represents the remaining members of a heterocyclic ring system, $R_2$ represents alkyl, aralkyl or an alkylene radical linked to the 8-position of the coumarin ring system and $R_3$ represents hydrogen or an optionally substituted phenyl radical, the rings A and B can carry further substituents and a carbocyclic 5-membered or 6-membered ring can be fused to the ring B, in a solvent which does not interfere with the emission, at a concentration, which emits laser beams, of, preferably, $10^{-2}$ to $10^{-4}$ mol/liter.

Suitable alkyl radicals $R_1$ and $R_2$ are, in particular, those with 1 to 5 C atoms, which can contain further, especially non-ionic, substituents, such as halogen, especially chlorine and bromine; nitrile; $C_1$–$C_4$-alkoxy, such as methoxy, ethoxy, n-propoxy and n-butoxy; di-$C_1$–$C_4$-alkylamino such as dimethylamino and diethylamino, and N-phenyl-N-$C_1$–$C_4$-alkylamino such as N-phenyl-N-methylamino; hydroxyl; cycloalkyl such as cyclohexyl, $C_1$–$C_4$-alkoxycarbonyl such as methoxycarbonyl, ethoxycarbonyl, β-methoxyethoxycarbonyl, β-ethoxyethoxycarbonyl and n-butoxycarbonyl; N-$C_1$–$C_4$-alkylaminocarbonyl such as methyl- or ethyl-aminocarbonyl; di-$C_1$–$C_4$-aminocarbonyl such as dimethylaminocarbonyl or diethylaminocarbonyl; and carbamoyl.

Suitable cycloalkyl radicals $R_1$ are preferably the cyclohexyl radical or the cyclopentyl radical.

Benzyl and phenylethyl radicals should be mentioned as preferred aralkyl radicals $R_1$ or $R_2$.

Preferred heterocyclic ring systems which can be formed by $R_1$ and $R_2$ via the shared nitrogen atom are 5-membered or 6-membered N-heterocyclic systems such as pyrrolidine, piperidine, morpholine, N-$C_1$–$C_4$-alkylpiperazine, pyrazoline and isoindoline.

Alkylene groups $R_1$ and $R_2$ which are linked to the 6-or 8-position of the coumarin ring system preferably contain two or three C chain members and can additionally be substituted, especially by methyl groups.

The ethylene radical and 1,3-propylene radical and the —C(CH$_3$)$_2$—CH$_2$—CH(CH$_3$)— group may be mentioned as examples of such alkylene groups.

A phenyl radical $R_3$ is preferably substituted in the o-position by a carboxyl radical or $C_1$–$C_4$-alkoxycarbonyl radical such as a methoxy-, ethoxy-, β-methoxyethoxy-, β-ethoxyethoxy-, β-hydroxyethyl-, propoxy- or butoxy-carbonyl radical. In addition, such a phenyl radical $R_3$ can also contain, for example, $C_1$–$C_4$-alkyl groups such as methyl, ethyl and trifluoromethyl, halogen such as chlorine, or $C_1$–$C_4$- alkoxy groups such as methoxy or ethoxy, a further carboxyl group or a sulpho group, as substituents.

Examples of substituents in the ring A which may be mentioned are the $C_1$–$C_3$-alkyl radical, especially methyl, halogen, such as chlorine, and $C_1$–$C_3$-alkoxy radicals such as methox, ethoxy or isopropoxy.

The following may be mentioned as examples of substituents in the ring B: $C_1$–$C_5$-alkyl radicals which can also be substituted further, such as methyl, trifluoromethyl, ethyl, β-cyanoethyl or tertiary butyl; 5- membered or 6-membered cycloalkyl radicals such as cyclohexyl; the phenyl radical; phenyl-$C_1$–$C_3$-alkyl radicals such as benzyl; halogen radicals such as chlorine, bromine or fluorine, preferably chlorine; $C_1$–$C_5$-alkoxy radicals such as methoxy, ethoxy, n-butoxy and isopropoxy; the phenoxy radical; $C_1$–$C_5$-alkylsulphonyl radicals such as methylsulphonyl, ethylsulphonyl, n-butylsulphonyl and β-hydroxyethylsulphonyl; the benzylsulphonyl radical; the phenylsulphonyl radical; carbamoyl or sulphamoyl radicals which can also optionally be substituted by one or two $C_1$–$C_4$-alkyl radicals which together with the shared N atom can form a heterocyclic 5-membered or 6-membered ring, such as, for example, $CONH_2$, $SO_2NH_2$, dimethylamino-carbonyl or -sulphonyl, diethylamino-carbonyl or -sulphonyl, N-piperidinocarbonyl or -sulphonyl, N-morpholino-carbonyl or -sulphonyl, N-pyrrolidino-carbonyl or -sulphonyl, n-butylamino-carbonyl or -sulphonyl and β-hydroxyethylamino-carbonyl or -sulphonyl; the nitrile radical; and the sulpho radical.

Possible carbocyclic 5-membered or 6-membered rings fused to B are, in particular, the benzo, cyclohexano or cyclopentano radical; a fused benzo ring is preferred.

Preferred laser dyestuffs of the formula I correspond to the formula

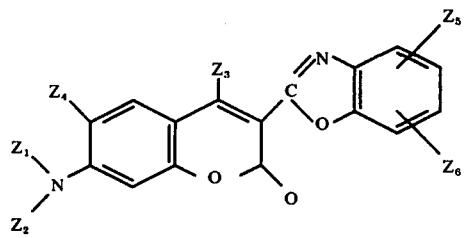

wherein
$Z_1$ and $Z_2$ represent $C_1$–$C_4$-alkyl radicals which can also be substituted by hydroxyl, chlorine, $C_1$–$C_4$-alkoxy, nitrile or phenyl,
$Z_3$ represents hydrogen or a phenyl radical substituted by an o-carboxyl or o-$C_1$–$C_3$-alkoxycarbonyl radical,
$Z_4$ represents hydrogen or methyl,
$Z_5$ represents hydroen, $C_1$–$C_5$-alkyl, chlorine, $C_1$–$C_3$-alkylsulphonyl, benzylsuphonyl, nitrile, sulpho, optionally mono- or di-$C_1$–$C_4$-alkyl-substituted carbamoyl or sulphamoyl, phenyl, cyclohexyl, phenyl-$C_1$–$C_3$-alkyl or $C_1$–$C_4$-alkoxy radicals or, together with
$Z_6$, the remaining members of a fused benzo, cyclohexano or cyclopentano radical, and
$Z_6$ represents hydrogen, chlorine or $C_1$–$C_4$-alkyl.

Particularly preferred laser dyestuffs of the formula II are those in which
$Z_1$ and $Z_2$ represent methyl or ethyl radicals,
$Z_3$ represents hydrogen,
$Z_4$ represents hydrogen, 2-carboxyphenyl or 2-$C_1$–$C_3$-alkoxycarbonylphenyl,
$Z_5$ represents hydrogen, methyl, tertiary butyl, chlorine, methylsulphonyl or ethylsulphonyl, nitrile, sulpho, $SO_2NH_2$, $SO_2N(CH_3)_2$, $SO_2N(C_2H_5)_2$, phenyl cyclohexyl, methoxy or ethoxy or together with $Z_6$ represents a benzo ring fused in the 4,5-position and
$Z_6$ represents hydrogen, chlorine or methyl.

Examples of solvents usable according to the invention, which do not hinder the stimulated emission, are water, mono- hydric and polyhydric alcohols, for example methanol, ethanol, isopropanol, butanol, ethylene glycol and glycol monoethyl ether, cyclic ethers, such as tetrahydrofurane and dioxane, aromatic compounds, such as benzene, toluene, phenol, resorcinol and cresols, and also cyclohexane, decalin, chloroform, dimethylsulphoxide, ketones, such as acetone, butanone-2 and cyclohexanone, esters, such as ethyl acetate, diethyl malonate, glycol diacetate and diethyl carbonate, and fluorinated alcohols, for example hexafluoroisopropanol.

The dyestuffs used in the laser according to the invention are in some cases known, for example from German Offenlegungsschriften (German published specifications Nos.) 2,030,507 and 2,058,877.

Coumarins of the formula I, wherein $R_3$ represents an optionally substituted phenyl radical, are obtained by reaction of benzophenones of the formula

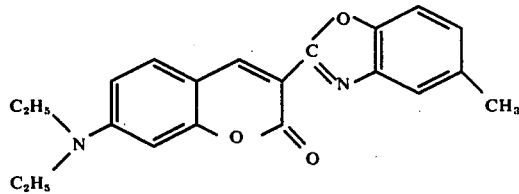

wherein
$R_1$, $R_2$ and A have the abovementioned meaning and the phenyl radical on the right-hand side can be substituted further,
with benzoxazolylacetic acid esters or amides or bis-benzoxazolylmethanes in concentrated sulphuric acid.

A number of the dyestuffs show, as a particular advantage, the effect of "super-radiance" described on page 3.

EXAMPLE 1

In a laser apparatus as described on page 2, the dyestuff of the formula

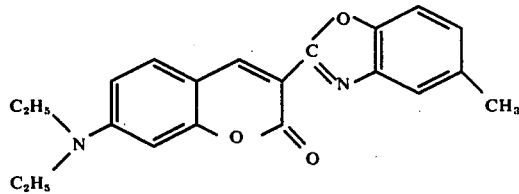

is dissolved in dimethylsulphoxide at a concentration of $5 \times 10^{-4}$ mol/l and the solution is pumped from the reservoir through a quartz glass cell which is irradiated by means of a $N_2$ laser of wavelength 337 nm.

The beam is focused into the cell by means of a cylindrical lens. Under these excitation conditions, a stimulated fluorescence radiation issues at right angles to the incident direction of the pump light, from the weakly reflectant window of the cell.

The radiation of the dyestuff laser was analysed in a spectral apparatus. The wavelength of the emission was 490 nm. The variation with time was observed by means of an oscillograph and photodiode.

Laser light was generated in the same way with the dyestuffs of the table which follows. The concentration employed and the wavelength of the emission can be seen from the table which follows:

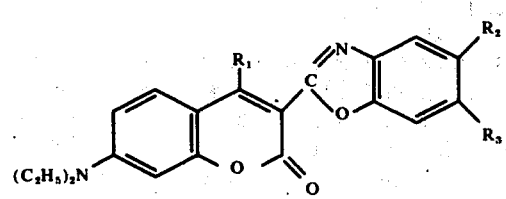

EXAMPLE 2

A solution of $5\times10^{-4}$ mol/l of the dye stuff of the formula

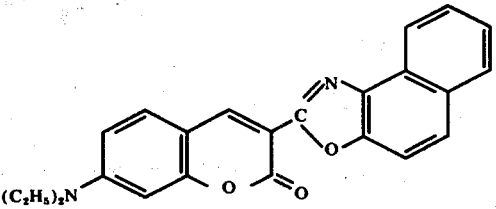

in dimethylsulphoxide is circulated in a flashlamp-pumped dyestuff laser (build-up time of the flashlamp 120 ns, electrical pumping energy 20 J; reflection data of the resonator mirror: $r_1 = 33\%$, $r_2 = 100\%$). The wavelength of the emitted laser light is 546 nm.

The dyestuffs

| Example | $R_1$ | $R_2$ | $R_3$ | Concentration mol/liter | Emission nm |
|---|---|---|---|---|---|
| 2 | H | $CH_3$ | $SO_3Na$ | $10^{-3}$ | 520 |
| 3 | H | $CH_3$ | $CH_3$ | $10^{-3}$ | 520 |
| 4 | H | $SO_2C_2H_5$ | H | $5 \times 10^{-4}$ | 500 |
| 5 | H | $SO_2N(CH_3)_2$ | H | $5 \times 10^{-4}$ | 500 |
| 6 | $C_2H_5OOC$-C$_6H_4$- | $CH_3$ | H | $10^{-3}$ | 470 |
| 7 | $HOOC$-C$_6H_4$- | $SO_2C_2H_5$ | H | $10^{-3}$ | 525 |
| 8 | $C_2H_5OOC$-C$_6H_4$- | $SO_2C_2H_5$ | H | $10^{-3}$ | 505 |
| 9 | $HOOC$-C$_6H_4$- | H | H | $10^{-3}$ | 525 |
| 10 | $HOOC$-C$_6H_4$- | $CH_3$ | H | $10^{-3}$ | 525 |

| Exam. | $R_1$ | Concentration mol/liter | Emission nm |
|---|---|---|---|
| 11 | [naphtho-oxazole coumarin with $(C_2H_5)_2N$] | $10^{-3}$ | 535 |
| 12 | [methyl-benzoxazole coumarin with $(CH_3)_2N$] | $10^{-3}$ | 535 |

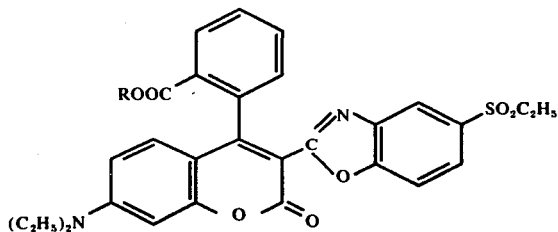

can be excited in a similar way to produce laser emission.

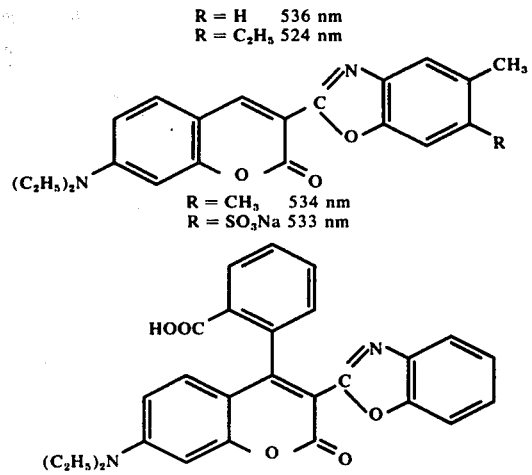

in ethanol 527 nm

Compound 10 (page 11) was prepared as follows:

A mixture of 17.2 g of 2-carboxy-2'-hydroxy-4'-diethylaminobenzophenone and 13.9 g of di-[5'-methylbenzoxazolyl-(2')]-methane was introduced in portions into 80 ml of 98% strength sulphuric acid, starting at 20° C, and applying cooling. The temperature was allowed to rise to 50° C and the mixture was stirred for 6 hours at 55°-60° C and then poured out onto 400 g of ice and 400 ml of water. After stirring for 2 hours, the crystalline precipitate was filtered off and washed first with water, then with sodium acetate solution and then again with water. Whilst still moist, the substance was recrystallised from dimethylformamide. Yield: 26.1 g of compound of the formula 10.

Compound 10 was converted into compound 6 in the following manner, by esterification with ethanol:

23 g of compound 10 were suspended in 100 ml of absolute ethanol, and the solution was saturated with dry HCl gas and heated to the boil under reflux for 20 hours. The clear red solution was poured out onto 200 g of ice, 200 g of saturated sodium acetate solution and 100 ml of water, the mixture was left to stand for 20 hours and the product was filtered off, washed with water, dried in vacuo at room temperature and recrystallised from ethanol. Yield: 21.3 g of compound of the formula 6.

The compounds of the formulae 7 and 8, and the last-mentioned compound in Example 2 were also prepared analogously.

We claim:

1. Dyestuff laser consisting of a reservoir containing a laser dyestuff solution and a pump light source connected thereto, which is capable of exciting the dyestuff solution to produce an emission, characterised in that the dyestuff solution contains a dyestuff of the general formula

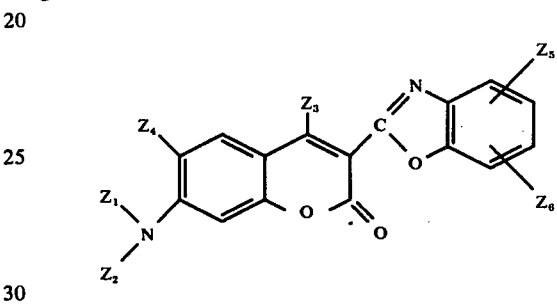

wherein
$Z_1$ and $Z_2$ represent $C_1$–$C_4$-alkyl radicals which can also be substituted by hydroxyl, chlorine, $C_1$–$C_4$-alkoxy, nitrile or phenyl,
$Z_3$ represents hydrogen or a phenyl radical substituted by an o-carboxyl or $C_1$–$C_3$-alkoxycarbonyl radical,
$Z_4$ represents hydrogen or methyl,
$Z_5$ represents hydrogen, $C_1$–$C_5$-alkyl, chlorine, $C_1$–$C_3$-alkylsulphonyl, benzylsulphonyl, nitrile, sulpho, optionally mono- or di-$C_1$–$C_4$-alkyl-substituted carbamoyl or sulphamoyl, phenyl, cyclohexyl, phenyl-$C_1$–$C_3$-alkyl or $C_1$–$C_4$-alkoxy radicals or, together with
$Z_6$, the remaining members of a fused benzo, cyclohexano or cyclopentano radical, and
$Z_6$ represents hydrogen, chlorine or $C_1$–$C_4$-alkyl.

2. Dyestuff laser according to claim 1, characterised in that the dyestuff solution contains the dyestuff at a concentration of $10^{-2}$ to $10^{-4}$ mol/l.

* * * * *